US008301929B2

United States Patent
Richards, III et al.

(10) Patent No.: US 8,301,929 B2
(45) Date of Patent: Oct. 30, 2012

(54) SYSTEM AND METHOD FOR DYNAMIC POWER REGULATOR FOR POWER SUPPLY OUTPUT ADJUSTMENT

(75) Inventors: George R. Richards, III, Round Rock, TX (US); Daniel E. Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 12/566,214

(22) Filed: Sep. 24, 2009

(65) Prior Publication Data

US 2011/0072294 A1    Mar. 24, 2011

(51) Int. Cl.
*G06F 11/30* (2006.01)
*G05F 5/00* (2006.01)
*H02J 3/12* (2006.01)

(52) U.S. Cl. ......... 713/340; 323/205; 323/234; 323/367

(58) Field of Classification Search .................. 713/340; 323/205, 234, 367
See application file for complete search history.

(56) References Cited

U.S. PATENT DOCUMENTS

| 2002/0135338 A1 | 9/2002 | Hobrecht et al. | 323/272 |
| 2006/0290330 A1* | 12/2006 | Harris et al. | 323/222 |
| 2009/0015228 A1* | 1/2009 | Sato et al. | 323/283 |
| 2009/0052212 A1* | 2/2009 | Lee | 363/65 |
| 2009/0067201 A1* | 3/2009 | Cai | 363/21.12 |
| 2009/0195190 A1* | 8/2009 | Fong et al. | 315/297 |

* cited by examiner

*Primary Examiner* — Vincent Tran
(74) *Attorney, Agent, or Firm* — Baker Botts L.L.P.

(57) ABSTRACT

An apparatus with a direct-current to direct-current power transformer is configured to transform an input voltage at an input terminal to an output voltage at an output terminal. A current sensor is coupled to the power transformer and configured to measure a current flowing through the power transformer. A voltage adjustment controller is coupled to the current sensor and the output terminal and configured to change the output voltage based at least on the measured current.

20 Claims, 2 Drawing Sheets

SYSTEM AND METHOD FOR DYNAMIC POWER REGULATOR FOR POWER SUPPLY OUTPUT ADJUSTMENT

TECHNICAL FIELD

The present disclosure relates in general to powering information handling systems, and more particularly to dynamically regulating the output of power supplies of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems require use of less power for both operational longevity and economy. Power losses can fluctuate depending upon the loads and circuitry coupled to the power supply. Power losses can include fixed losses, proportional losses, and distribution (current^2*resistance) losses.

SUMMARY

In accordance with the teachings of the present disclosure, the disadvantages and problems associated with regulating and providing power to an information handling system have been substantially reduced or eliminated.

In accordance with one embodiment of the present disclosure, an apparatus with a direct-current to direct-current power transformer is configured to transform an input voltage at an input terminal to an output voltage at an output terminal. A current sensor is coupled to the power transformer and configured to measure a current flowing through the power transformer. A voltage adjustment controller is coupled to the current sensor and the output terminal and configured to change the output voltage based at least on the measured current.

In accordance with another embodiment of the present disclosure, an information handling system with one or more information handling resources and a direct-current to direct-current power transformer is configured to transform an input voltage at an input terminal to an output voltage at an output terminal. A current sensor is coupled to the power transformer and configured to measure a current flowing through the power transformer. A voltage adjustment controller is coupled to the current sensor and the output terminal and is configured to change the output voltage based at least on the measured current.

In accordance with a further embodiment of the present disclosure, a method for regulating electrical power in an information handling system includes the steps of transforming an input voltage at an input terminal to an output voltage at an output terminal, sensing current flowing to the output terminal, causing a first change to the output voltage, measuring a first magnitude of the current prior to the first change, measuring a second magnitude of the current after the first change, comparing the first magnitude to the second magnitude, and causing a second change to the output voltage based at least on the comparison and the first change.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
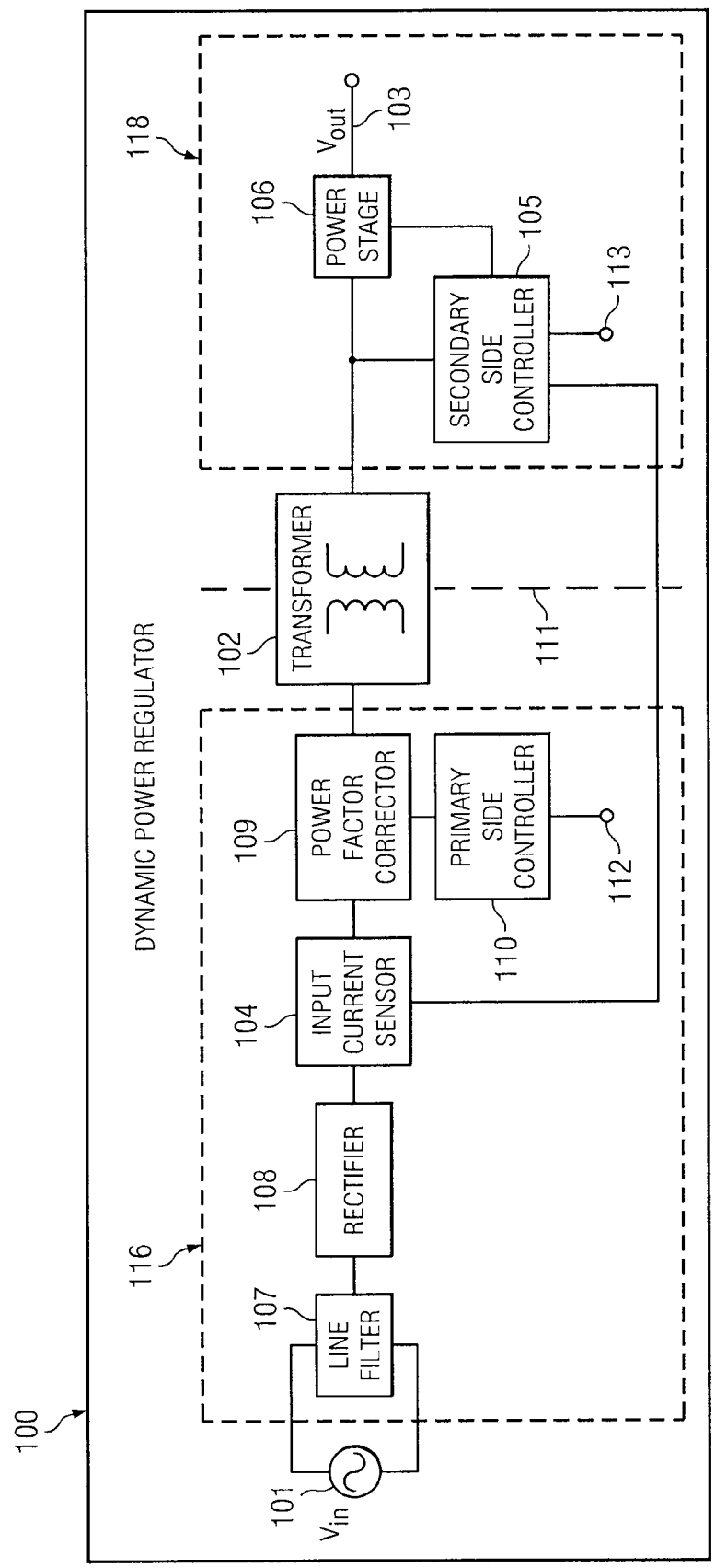
FIG. 1 illustrates a block diagram of an example system for regulating power in information handling systems, in accordance with the present disclosure.
Figure 2:
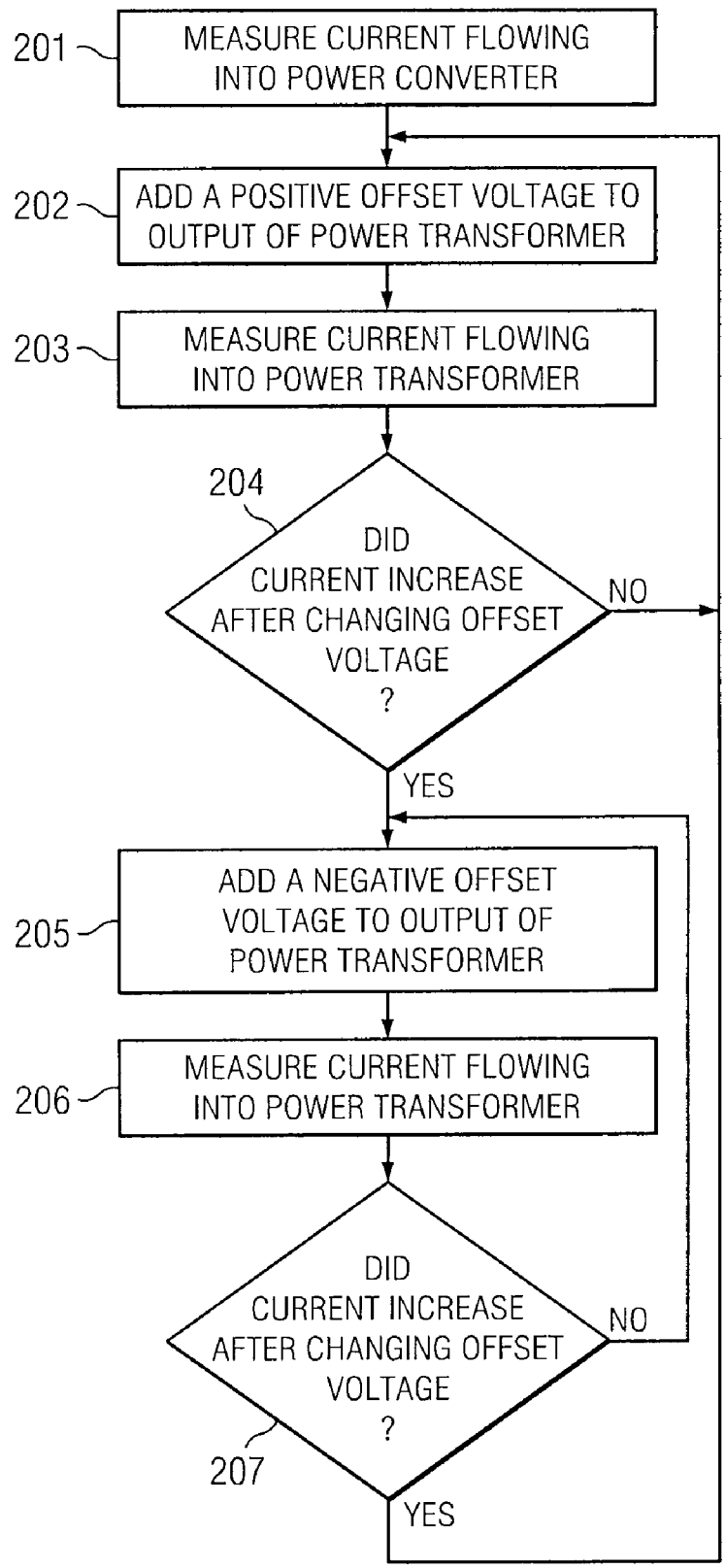
FIG. 2 illustrates a flow chart of an example method for regulating power in information handling systems, in accordance with the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

FIG. 1 shows an example system 100 for regulating power in information handling systems, in accordance with the present disclosure.

An input voltage source 101 is coupled through a power transformer 102 to provide voltage to an output voltage terminal 103. Input voltage source 101 may be an alternating current voltage. Conversely, input voltage source 101 may be a direct current. Power transformer 102 may be a direct-current to direct-current power transformer, and in some embodiments may be a step-down power transformer. In embodiments in which system 100 is an integral part of an information handling system, output voltage terminal 103 may be coupled to one or more information handling resources. In other embodiments, output voltage terminal 103 may be coupled to an information handling system, or another electrical or electronic component or system. Output voltage terminal 103 may comprise of or consist of any generally electrically conductive material. In one embodiment, the output voltage at output voltage terminal 103 may be in the approximate range of 12 to 13 volts. System 100 may be the to comprise a primary side 116, comprising the portion of system 100 providing power into power transformer 102 (e.g., input voltage source 101, power factor corrector 109, etc.), and a secondary side 118, comprising the portion of system 100 receiving power from power transformer 102 (e.g., voltage output terminal 103, power stage 106, etc.). The primary side 116 and secondary side 118 may be electrically isolated from each other through an isolation mechanism 111.

An input current sensor 104 may be coupled between input voltage source 101 and power transformer 102. Input current sensor 104 may be configured to measure current flowing through system 100 between input voltage source 101 and power transformer 102. Input current sensor 104 may comprise a micrcontroller, chip, and/or a circuit of electronic components.

A secondary side controller 105 may be coupled to the output of power transformer 102 and to the output of input current sensor 104. Secondary side controller 105 may be configured to receive the value transmitted by input current sensor 104 (e.g., representing a current flowing between input voltage source 101 and power transformer 102) and evaluate the value to determine whether or not to alter the output voltage of power transformer 102. Secondary side controller 105 may make this evaluation by comparing the output of input current sensor 104 in relation to prior output of current sensor 104 and prior changes in the output voltage made by secondary side controller 105. In some embodiments, secondary side controller 105 may increase, decrease, or not change the output voltage from the power transformer through operation of power stage 106, as described in greater detail below. In other embodiments, secondary side controller 105 may affect any changes directly to output voltage terminal 103. Secondary side controller 105 may comprise a microntroller, chip, or a circuit of electronic components.

Power stage 106 may be coupled to power transformer 102 and/or to secondary side controller 105. Secondary side controller 105 may signal to power stage 106 whether to increase, decrease, or not change the output voltage of power transformer 102. Power stage 106 may then accordingly change the voltage transmitted from power transformer 102 and couple the resulting voltage to output voltage terminal 103. Power stage 106 may accomplish other functions related to the output of voltage, including filtering. Power stage 106 may be comprised of a microcontroller, chip, and/or a circuit of electronic components. In one embodiment, power stage 106 may comprise a power factor correction circuit.

Line filter 107 may be coupled between input voltage source 101 and power transformer 102. Line filter 107 may be configured to filter noise from input voltage source 101.

Rectifier 108 may be coupled between input voltage source 101 and power transformer 102. Rectifier 108 may be configured to translate an alternating current into a direct current. In some embodiments, rectifier 108 may comprise a bridge rectifier. In the same or alternative embodiments, rectifier 108 may be coupled to line filter 107.

Power factor corrector 109 may be coupled between input voltage source 101 and power transformer 102. Power factor corrector 109 may be configured to adjust the power factor of system 100. In one embodiment, power factor corrector 109 may be configured to adjust the power factor of system 100 to near 1.0. In some embodiments, power factor corrector 109 may be coupled to input current sensor 104 and power transformer 102. Power factor corrector 109 may comprise a boost active power factor corrector circuit.

Primary side controller 110 may be coupled to power factor corrector 109. Primary side controller 110 may be configured to control the parameters of operation of power factor corrector 109 by, for example setting the gains of power factor corrector 109.

Primary side controller 110 and secondary side controller 105 may have access terminals 112, 113 by which operational parameters, output information, history, and statistics may be accessed or recorded.

In operation, system 100 may regulate power supplied to an information handling system. The voltage requirements for an information handling system often remain relatively constant. Losses associated with the power provided to the information handling system may vary according to the continually changing load requirements of the electrical and electronic components of the information handling system. The present invention reduces these losses by minimizing the current supplied to the information handling system while supplying a sufficient voltage.

Input voltage source 101 may introduce voltage into the system 100. Line filter 107, rectifier 108, power factor 109, and primary side controller 110 may affect the input voltage source 101 such that an acceptable voltage signal (e.g., with noise filtered, alternating current rectified to direct current, etc.) supplied to power transformer 102. Power transformer 102 may transform the voltage into a higher or lower value and/or deliver an output voltage to output voltage terminal 103. The current flowing into the power transformer 102 may measured by input current sensor 104 and the value of such current may be transmitted to secondary side controller 105.

Secondary side controller 105 may add or subtract a small amount, relative to the output voltage, from the output voltage of power transformer 102. This initial change in output voltage can be referred to as the delta voltage. In some embodiments, the amount is may be approximately 0.1 volts. In other embodiments, the amount may be approximately 0.5 volts. Secondary side controller 105 may accomplish this directly by outputting voltage to output voltage terminal 103 or by suitably controlling power stage 106. Current flowing through power transformer 102 may again measured by input current sensor 104 and the value of such current may be transmitted to secondary side controller 105. Secondary side controller 105 may compare the most recent current reading with the previous current reading. If the current flowing through power transformer 102 has decreased, then secondary side controller 105 may repeat the action previously taken. If the current flowing through power transformer 102 has increased, then secondary side controller may reverse the action previously taken. For example, if a positive voltage was originally added, a negative voltage may now be added. If a negative voltage was originally added, a positive voltage will now be added. The absolute values of the negative and positive voltage may be approximately equal. The system may continue to take current measurements and adjusting the output voltages to continue to regulate the power being provided to the rest of the information handling system.

FIG. 2 illustrates a flow chart of an example method 200 for regulating power in one or more information handling systems, in accordance with the present disclosure.

According to one embodiment, method 200 preferably begins at step 201. As noted above, teachings of the present disclosure may be implemented in a variety of configurations of system 100. As such, the preferred initialization point for method 200 and the order of the steps 201-207 comprising method 200 may depend on the implementation chosen.

At step 201, input current sensor 104 may measure the current flowing through power transformer 102. At step 202, secondary side controller 105 may add a positive voltage offset to the output of power transformer 102. At step 203, input current sensor 104 may measure the current flowing through power transformer 102. At step 204, secondary side controller 105 may compare the two previously-measured currents. If the current decreased after changing the offset voltage, then method 200 may proceed again to step 202. Otherwise, if the current increased after changing the offset voltage, then method 200 may proceed to step 205.

At step 205 secondary side controller 105 may add a negative voltage offset to the output of power transformer 102. At step 206, input current sensor 104 may measure the current flowing through power transformer 102. At step 207, secondary side controller 105 may compare the two previously measured currents. If the current decreased after changing the offset voltage, then method 200 may proceed to step 205. Otherwise, if the current increased after changing the offset voltage, then method 200 may proceed to step 202.

Although FIG. 2 discloses a particular number of steps to be taken with respect to method 200, method 200 may be executed with more or fewer steps than those depicted in FIG. 2. In addition, although FIG. 2 discloses a certain order of steps to be taken with respect to method 200, the steps comprising method 200 may be completed in any suitable order. For example, in the embodiment of method 200 shown above, the first offset voltage introduced to the output of power transformer 102 may be negative, instead of positive. Accordingly, in some embodiments, step 205 may execute after step 201

Method 200 may be implemented using system 100 or any other system operable to implement method 200. In certain embodiments, method 200 may be implemented partially or fully in software embodied in computer-readable media.

Using the methods and systems disclosed herein, problems associated with conventional approaches to regulating power in an information handling system may be improved, reduced, or eliminated. For example, the methods and systems disclosed herein dynamically minimize the current used by system loads of varying sizes, reducing power loss.

Although the present disclosure has been described in detail, it should be understood that various changes, substitutions, and alterations can be made hereto without departing from the spirit and the scope of the disclosure as defined by the appended claims.

What is claimed is:

1. An apparatus comprising:
a direct-current to direct-current power transformer, configured to transform an input voltage at an input terminal to an output voltage at an output terminal;
a current sensor coupled to the power transformer and configured to measure a current flowing through the power transformer; and,
a voltage adjustment controller coupled to the current sensor and the output terminal and configured to change the output voltage based at least on the measured current.

2. The apparatus according to claim 1, wherein:
the voltage adjustment controller is further configured to cause a first change to the output voltage; and
the current sensor further configured to:
measure a first magnitude of the current prior to the first change; and
measure a second magnitude of the current after the first change;
further wherein the voltage adjustment controller is further configured to:
compare the first magnitude to the second magnitude; and
cause a second change to the output voltage based at least on the comparison and the first change.

3. The apparatus according to claim 2, wherein the voltage adjustment controller is configured to increase the output voltage if the first change is an increase in output voltage and the first magnitude is greater than the second magnitude.

4. The apparatus according to claim 2, wherein the voltage adjustment controller is configured to decrease the output voltage if the first change is an increase in output voltage and the first magnitude is less than the second magnitude.

5. The apparatus according to claim 2, wherein the voltage adjustment controller is configured to increase the voltage output if the first change is a decrease in output voltage and the first magnitude is less than the second magnitude.

6. The apparatus according to claim 2, wherein the voltage adjustment controller is configured to decrease the voltage output if the first change is a decrease in output voltage and the first magnitude is greater than the second magnitude.

7. The apparatus according to claim 1, wherein power is provided to downstream power transformers within the power subsystem of the apparatus and the load requirements of the downstream power transformers fluctuate during operation.

8. An information handling system comprising:
one or more information handling resources;
a direct-current to direct-current power transformer, configured to transform an input voltage at an input terminal to an output voltage at an output terminal;

a current sensor coupled to the power transformer and configured to measure a current flowing through the power transformer; and, a voltage adjustment controller coupled to the current sensor and the output terminal and configured to change the output voltage based at least on the measured current.

9. The system according to claim 8, wherein:

the voltage adjustment controller is further configured to cause a first change to the output voltage; and the current sensor further configured to:

measure a first magnitude of the current prior to the first change; and measure a second magnitude of the current after the first change;

further wherein the voltage adjustment controller is further configured to:

compare the first magnitude to the second magnitude; and cause a second change to the output voltage based at least on the comparison and the first change.

10. The system according to claim 9, wherein the voltage adjustment controller is configured to increase the output voltage if the first change is an increase in output voltage and the first magnitude is greater than the second magnitude.

11. The system according to claim 9, wherein the voltage adjustment controller is configured to decrease the voltage output if the first change is a increase in output voltage and the first magnitude is less than the second magnitude.

12. The system according to claim 9, wherein the voltage adjustment controller is configured to increase the voltage output if the first change is a decrease in output voltage and the first magnitude is less than the second magnitude.

13. The system according to claim 9, wherein the voltage adjustment controller is configured to decrease the voltage output if the first change is a decrease in output voltage and the first magnitude is greater than the second magnitude.

14. The system according to claim 8, wherein power is provided to downstream power transformers within the power subsystem of the apparatus and the load requirements of the downstream power transformers fluctuate during operation.

15. A method for regulating electrical power in an information handling system including the steps of:

transforming an input voltage at an input terminal to an output voltage at an output terminal;

sensing current flowing to the output terminal;

causing a first change to the output voltage, the change including adding an offset voltage to the output voltage received from the output terminal;

measuring a first magnitude of the current prior to the first change;

measuring a second magnitude of the current after the first change;

comparing the first magnitude to the second magnitude; and causing a second change to the output voltage based at least on the comparison and the first change.

16. The method according to claim 15, wherein the second change to the output voltage is an increase in the output voltage if the first change to the output voltage is an increase in output voltage and the first magnitude is greater than the second magnitude.

17. The method according to claim 15, wherein the second change to the output voltage is a decrease in the voltage output if the first change to the output voltage is a increase in output voltage and the first magnitude is less than the second magnitude.

18. The method according to claim 15, wherein the second change to the output voltage is an increase in the voltage output if the first change to the output voltage is a decrease in output voltage and the first magnitude is less than the second magnitude.

19. The method according to claim 15, wherein the second change to the output voltage is a decrease in the voltage output if the first change to the output voltage is a decrease in output voltage and the first magnitude is greater than the second magnitude.

20. The method according to claim 14, wherein the regulation of electrical power acts in response to fluctuating load requirements of the downstream power transformers.

* * * * *